R. M. WATKINS.
WIND SHIELD.
APPLICATION FILED FEB. 26, 1910.
995,308.
Patented June 13, 1911.
2 SHEETS—SHEET 2.
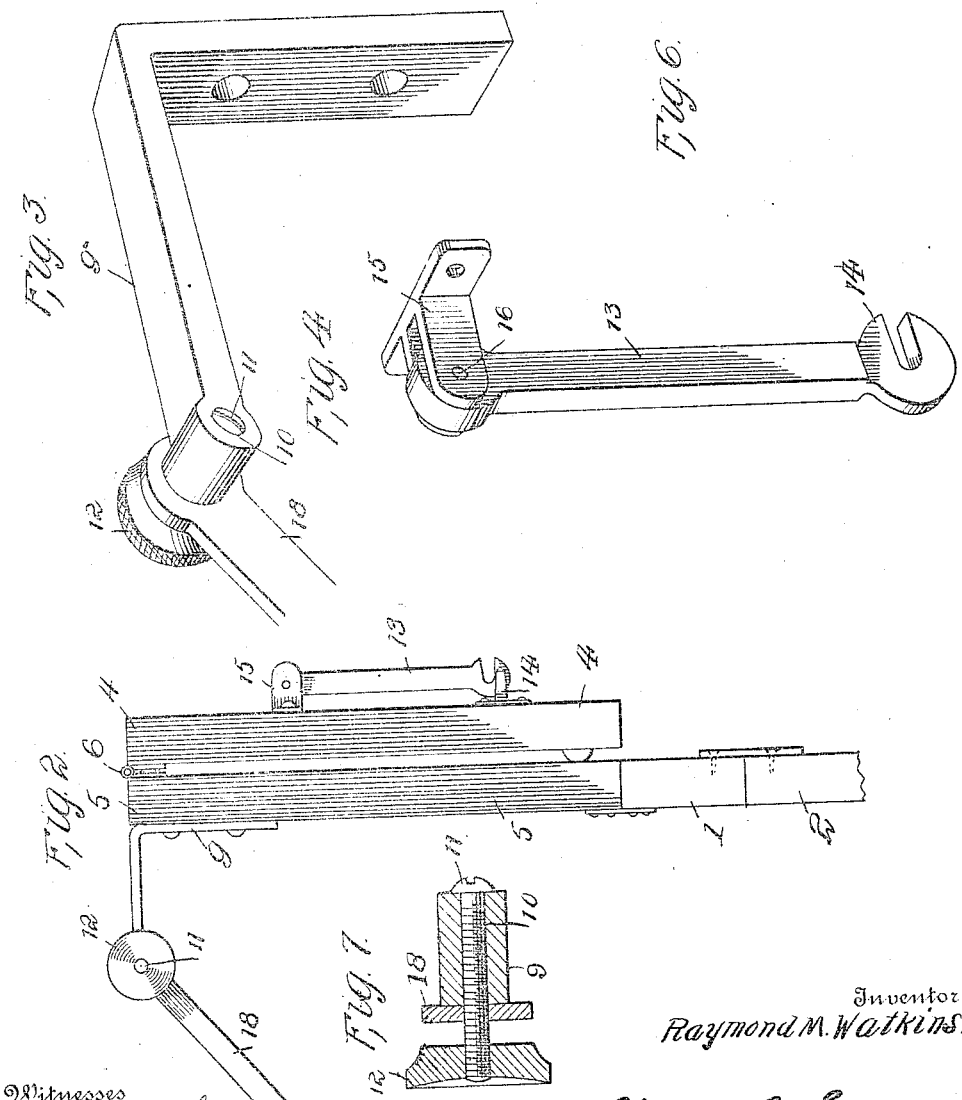
Witnesses
William Smith.
V. B. Hillyard.
Inventor
Raymond M. Watkins.
By Victor J. Evans
Attorney

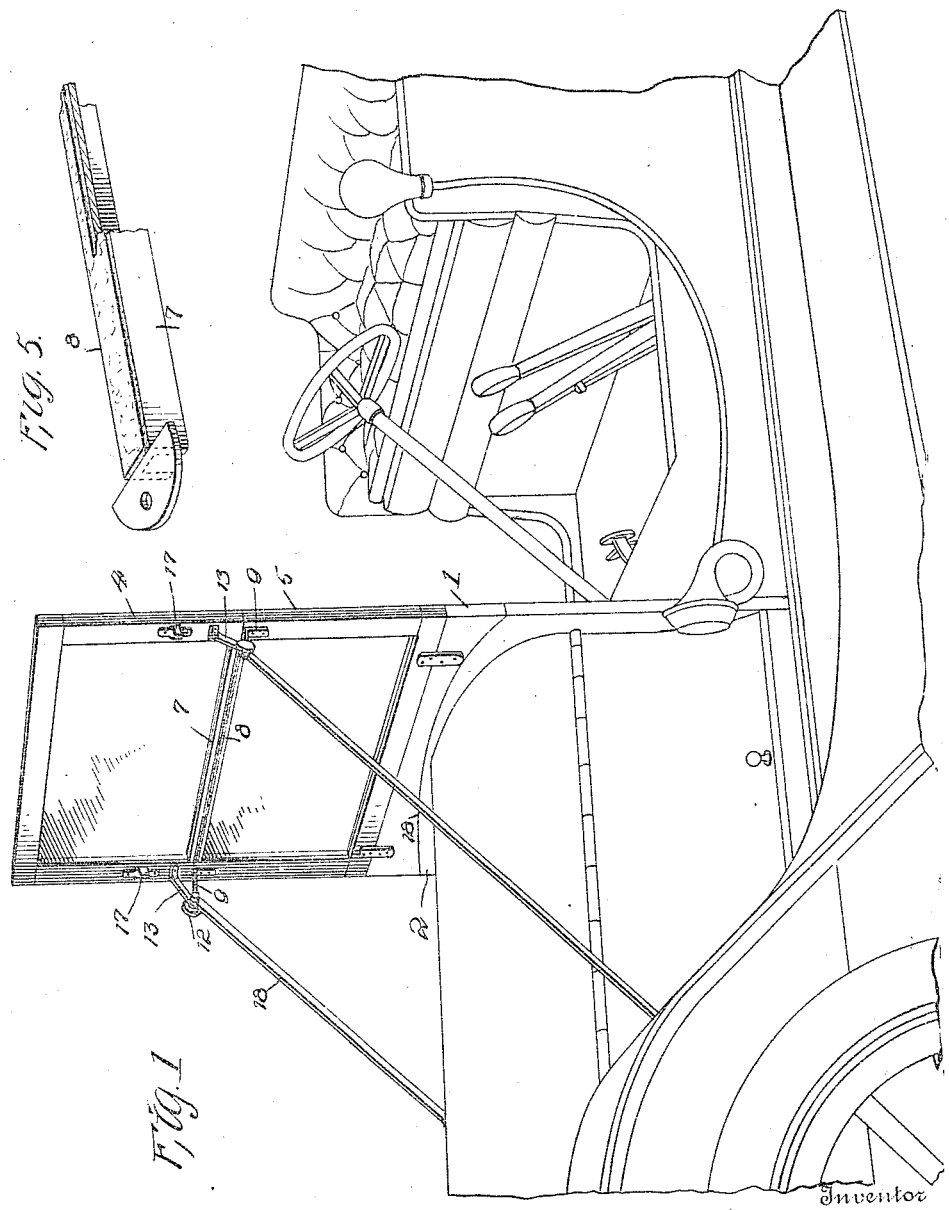

UNITED STATES PATENT OFFICE.

RAYMOND M. WATKINS, OF PITTSBURG, PENNSYLVANIA.

WIND-SHIELD.

995,308. Specification of Letters Patent. Patented June 13, 1911.

Application filed February 26, 1910. Serial No. 546,077.

*To all whom it may concern:*

Be it known that I, RAYMOND M. WATKINS, a citizen of the United States, residing at E. E. Pittsburg, in the county of Allegheny and State of Pennsylvania, have invented new and useful Improvements in Wind-Shields, of which the following is a specification.

The present invention appertains to a protector for vehicles to prevent wind, dust, sleet, and rain from beating into the face and otherwise causing discomfort, the purpose being to provide a protector or shield of the foldable type particularly adapted for mechanically propelled road machines, such as automobiles.

The invention has for its object primarily to provide an improved wind-shield comprising hinged or pivoted sections and novel connecting means between the sections to hold the same extended, said connections embodying a fixed bracket and a pivoted brace, the latter being held close to the folding section of the wind-shield by means of a spring clip when said section is folded.

The invention consists of the novel features, details of construction and combination of parts, which hereinafter will be more particularly set forth, illustrated in the accompanying drawings, and pointed out in the appended claims.

Referring to the drawings, forming a part of the application, Figure 1 is a perspective view of a wind-shield embodying the invention, showing the same applied to the front portion of an automobile and having the sections extended. Fig. 2 is a detail view, showing the relative position of the parts when the upper section or frame of the wind-shield is folded. Fig. 3 is a detail perspective view of the bracket. Fig. 4 is a detail perspective view of the pivoted brace. Fig. 5 is a perspective view of an end portion of one of the channel bars, showing the covering strip applied thereto. Fig. 6 is a detail perspective view of one of the spring clips. Fig. 7 is a sectional detail of the joint formed between one of the brackets and the brace rods.

Corresponding and like parts are referred to in the following description, and indicated in all the views of the drawings, by the same reference characters.

The wind-shield or protector is adapted for general use to prevent the occupants of a vehicle from suffering inconvenience and discomfort from blasts of air or from dust, sleet, or rain, the shield embodying folding sections connected in any manner to admit of the upper section folding upon the lower section when it is required to reduce the height of the wind-shield.

Inasmuch as the wind-shield is specially designed for automobiles it is illustrated in this application in the accompanying drawings.

It is to be understood that a filling board 1 will be employed when necessary to adapt the wind-shield to various makes of machines, said filling board being secured to the dashboard 2 and having the wind-shield secured thereto by strap irons 3 or analogous connecting means.

The wind shield comprises an upper section or frame 4 and a lower section or frame 5. These sections may be of similar or desired construction and may be formed of any material, such as metal or wood or a combination thereof. Each of the sections comprises a frame and a window. As shown the sections 4 and 5 are connected by hinges 6, which may be of any formation so as to admit of the section 4 folding upon the section 5. Channel bars 7 connect the inner or meeting ends of the side member of the respective sections 4 and 5 and receive the inner or meeting edges of the window panes. The abutting or meeting faces of the channel bars are covered with strips 8 of felt or other material, which insures a close joint between the sections when extended and which also prevent the exposed edges of the channel bars reflecting light into the eyes of the driver or occupants of the machine. The felt or covering strips 8 may be of any color, green being preferred because of its soothing nature to the eyes.

A bracket 9 is secured to the upper end of each side member comprising the frame of the lower section 5, said bracket consisting of a vertical member and a horizontal member, the latter terminating at its outer end in a threaded opening 10 in which is fitted a screw 11. A thumb nut 12 is mounted upon each of the screws 11 and its edge is milled or otherwise formed to enable the hand to obtain a firm grip thereon. A brace 13 is pivotally connected to each side member of the frame of the upper section 4 and is provided at its outer or free end with a hook 14 adapted to engage the screw 11 of the adjacent bracket 9. The brace 13 may be pivotally connected to the frame of the upper section 4 in any manner and as shown a bracket 15 is employed, the same consisting of a base plate and spaced ears, the latter projecting from the base plate and receiving between them the end of the brace 13, which latter is connected to the spaced ears by a pin 16 passed through registering openings formed in the ears of the bracket 15 and in the end of the brace 13 connected thereto.

When the sections 4 and 5 of the windshield are in line the ends of the side members of the frame abut and the hooks 14 of the braces 13 engage the screws 11 and are made secure by screwing home the thumb nuts 12 so as to clamp the hooks 14 between said thumb nuts and the outer ends of the brackets 9. Spring clips 17 are provided upon the side members of the upper section 4 to receive the free ends of the braces 13 after the latter have been disengaged from the brackets 9 and thrown upward against the side members of said section 4, thereby retaining the braces in folded position and out of the way.

As indicated brace rods 18 are interposed between the wind-shield and the truck of the machine and these brace rods may be connected to the upper portion of the lower section 5 in any manner so as to insure stability to the wind-shield. In the preferable construction it is preferred to attach the brace rods 18 at their upper ends to the horizontal members of the brackets 9 by means of the screws 11 and thumb nuts 12.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A wind-shield comprising upper and lower foldable sections, brackets secured to the upper portion of the lower section, braces pivoted to the upper section and adapted to engage the said brackets to hold the two sections extended, and spring clips provided upon the upper section to engage the free ends of said braces and to hold the latter in folded position.

2. In a wind-shield comprising upper and lower folding sections, brackets secured to the upper ends of the frame of the lower section, each of the brackets comprising a vertical member and a horizontal member, the latter having a threaded opening at its outer end, screws fitted in the threaded openings of the brackets, thumb nuts mounted upon the outer ends of said screws, and braces pivoted to the side members of the upper section and terminating in hooks to engage the aforesaid screws applied to the brackets and adapted to be clamped to said bracket by means of the thumb nuts.

In testimony whereof I affix my signature in presence of two witnesses.

RAYMOND M. WATKINS.

Witnesses:
ANNIE B. WATKINS,
HARRIS C. FOUR.